United States Patent
Schenk, Jr.

(10) Patent No.: US 6,742,396 B2
(45) Date of Patent: Jun. 1, 2004

(54) METHOD FOR UPGRADING A DIAL INDICATOR TO PROVIDE REMOTE INDICATION CAPABILITY

(75) Inventor: William P. Schenk, Jr., Rockford, TN (US)

(73) Assignee: Robertshaw Controls Company, Richmond, VA (US)

( * ) Notice: Subject to any disclaimer, the term of this patent is extended or adjusted under 35 U.S.C. 154(b) by 126 days.

(21) Appl. No.: 10/003,622

(22) Filed: Nov. 2, 2001

(65) Prior Publication Data

US 2002/0144555 A1 Oct. 10, 2002

Related U.S. Application Data

(60) Provisional application No. 60/282,054, filed on Apr. 7, 2001.

(51) Int. Cl.[7] ................................................. G01L 9/14
(52) U.S. Cl. ..................................................... 73/735
(58) Field of Search ......................... 73/305, 313, 317, 73/319, 735, 753, 427; 340/870.09, 870.16, 870.38, 612, 613, 618, 623, 624, 629

(56) References Cited

U.S. PATENT DOCUMENTS

| | | | |
|---|---|---|---|
| 3,206,905 A | 9/1965 | Wavering et al. | |
| 3,562,681 A | 2/1971 | Binder | |
| 4,016,827 A | * 4/1977 | Lawrence, Jr. ............... | 116/204 |
| 4,363,402 A | 12/1982 | Grzyll | |
| 4,554,494 A | 11/1985 | Howeth | |
| 4,911,011 A | 3/1990 | Fekete et al. | |
| 4,924,221 A | 5/1990 | Filippone | |
| 4,975,687 A | 12/1990 | Murphy, Jr. et al. | |
| 4,987,400 A | 1/1991 | Fekete | |
| 5,111,201 A | 5/1992 | Matsumura et al. | |
| 5,231,508 A | 7/1993 | Murphy, Jr. | |
| 5,305,639 A | 4/1994 | Pontefract | |
| 5,405,004 A | 4/1995 | Vest et al. | |
| 5,493,917 A | 2/1996 | Clanin | |
| 5,585,809 A | 12/1996 | Yajima et al. | |
| 5,608,386 A | 3/1997 | Murphy, III et al. | |
| 5,619,560 A | 4/1997 | Shea | |
| 5,642,097 A | 6/1997 | Martel | |
| 5,699,910 A | 12/1997 | Kubat | |
| 5,708,424 A | 1/1998 | Orlando et al. | |
| 6,089,086 A | 7/2000 | Swindler et al. | |

FOREIGN PATENT DOCUMENTS

JP   11118652   4/1999

* cited by examiner

*Primary Examiner*—Willliam Oen
(74) *Attorney, Agent, or Firm*—Sampson & Associates

(57) ABSTRACT

A dial indicator, method, and kit for upgrading a dial indicator to provide both local visible and remote indication of a measured physical parameter is provided. A magnetic rotary pointer is provided by coupling a magnet to a pointer, or by providing a replacement pointer having an integral magnet, so that the magnetic rotary pointer is rotatable in response to a change a measured physical parameter. A potentiometer is magnetically coupled to the magnetic rotary pointer, and is fastened to a front side of the dial indicator.

39 Claims, 6 Drawing Sheets

METHOD FOR UPGRADING A DIAL INDICATOR TO PROVIDE REMOTE INDICATION CAPABILITY

RELATED APPLICATIONS

This application claims the benefit of U.S. Provisional Patent Application Ser. No. 60/282,054, entitled Capacity Measurement Device For A Liquid Storage Tank, filed Apr. 7, 2001.

BACKGROUND OF THE INVENTION (1) Field of the Invention

The present invention relates generally to a dial indicator, and more particularly relates to a dial indicator capable of providing both local visible indication and remote indication of a physical parameter.

(2) Background Information

Dial indicators (also variously referred to as dial gauges, indicator gauges, dial faces, and/or analog gauges) are commonly used to indicate a host of physical parameters such as temperature, pressure, electrical properties, liquid levels, among others. For example, liquid storage tanks for fuel, oil, propane, natural gas, and ammonia typically include a dial indicator attached thereto for providing an on-site, visible reading of the liquid level (i.e., the percentage of the total tank volume occupied by the liquid. For many applications it is desirable, both for convenience and economic factors, to have both local visible indication and remote indication of the above-mentioned physical parameters. For example, it is generally necessary for a user to be aware of the quantity of remaining liquid in a liquid storage tank, such as for determining when refilling is necessary. In some industrial applications, in which large numbers of tanks are employed, remote indication may be desirable. However, local visual indication may also be desirable, for example, to monitor the filling operation.

Examples of indicators providing both on-site and remote indication are disclosed in U.S. Pat. No. 4,554,494 to Howeth; U.S. Pat. No. 4,911,011 to Fekete, et al.; U.S. Pat. No. 4,975,687 to Murphy, Jr. et al.; U.S. Pat. No. 4,987,400 to Fekete; U.S. Pat. No. 5,305,639 to Pontefract; and U.S. Pat. No. 5,357,815 to Williamson; each of which is fully incorporated by reference herein. Fekete, et al., in U.S. Pat. Nos. 4,911,011 and 4,987,400, for example, disclose a dial indicator having a magnetically driven voltage divider built into the device behind the dial face for providing an electrical indication of liquid level in a liquid storage tank.

The above systems tend to be complex and therefore may be relatively expensive. Further, for some applications for which both local and remote indication are desirable, it may not be economically feasible to replace the existing gauge. Further still, for many applications, dial indicators providing for both local visual and remote indication may not be commercially available. Therefore, there exists a need for a relatively simple and inexpensive dial indicator that provides for both onsite and remote indication. There also exists a need for a relatively simple and inexpensive method for upgrading a conventional dial indicator (which provides only visual indication) to include the capability of providing remote indication.

SUMMARY OF THE INVENTION

One aspect of the present invention includes a method for upgrading a dial indicator to provide both local visible and remote indication of a physical parameter. The method includes providing the dial indicator with a magnetic rotary pointer, the magnet rotary pointer being rotatable in response a change in the physical parameter. The method further includes magnetically coupling a potentiometer to the magnet, the potentiometer being magnetically adjustable, wherein a rotation of the magnet causes a change in the electrical output of the potentiometer and fastening said potentiometer to a front side of the dial indicator. In variations of this aspect, the magnetic rotary pointer is provided by securing a magnet to a pre-existing rotary pointer, or by replacing the pre-existing rotary pointer with a replacement rotary pointer having a magnet integrated therewith. In another variation of this aspect the dial indicator is mounted to a liquid storage tank and the potentiometer is fastened to the dial indicator by interposing it between a transparent bracket and a transparent cover, and fastening the bracket to the dial indicator.

In another aspect, this invention includes a kit for upgrading a dial indicator to provide both local visible and remote indication of a physical parameter. The kit includes a magnet, sized and shaped for coupling to the dial indicator in a manner in which the magnet rotates in response to a change in the measured physical parameter, a magnetically adjustable potentiometer, and a mounting assembly that includes a bracket, sized and shaped for fastening the potentiometer to the dial indicator. In variations of this aspect, the magnet may be sized and shaped for being secured to a pre-existing rotary pointer of the dial indicator, or the magnet may include a replacement rotary pointer.

In yet another aspect, this invention includes a dial indicator for providing a local visible and a remote display of a liquid level in a liquid storage tank. The dial indicator includes a magnetic rotary pointer which is rotatable in response to a change in the liquid level in the tank. The dial indicator further includes a magnetically adjustable potentiometer including a voltage divider and at least two electrical connectors, the potentiometer being magnetically coupled to the magnetic rotary pointer so that rotation of the magnetic rotary pointer causes a change in the electrical output of the potentiometer. The potentiometer is mounted to a front side of the dial indicator by a transparent bracket. In variations of this embodiment, the magnetic rotary pointer includes a rotary pointer having a magnet secured thereto, or includes a replacement rotary pointer having a magnet disposed integrally therewith.

DETAILED DESCRIPTION

Figure 1:
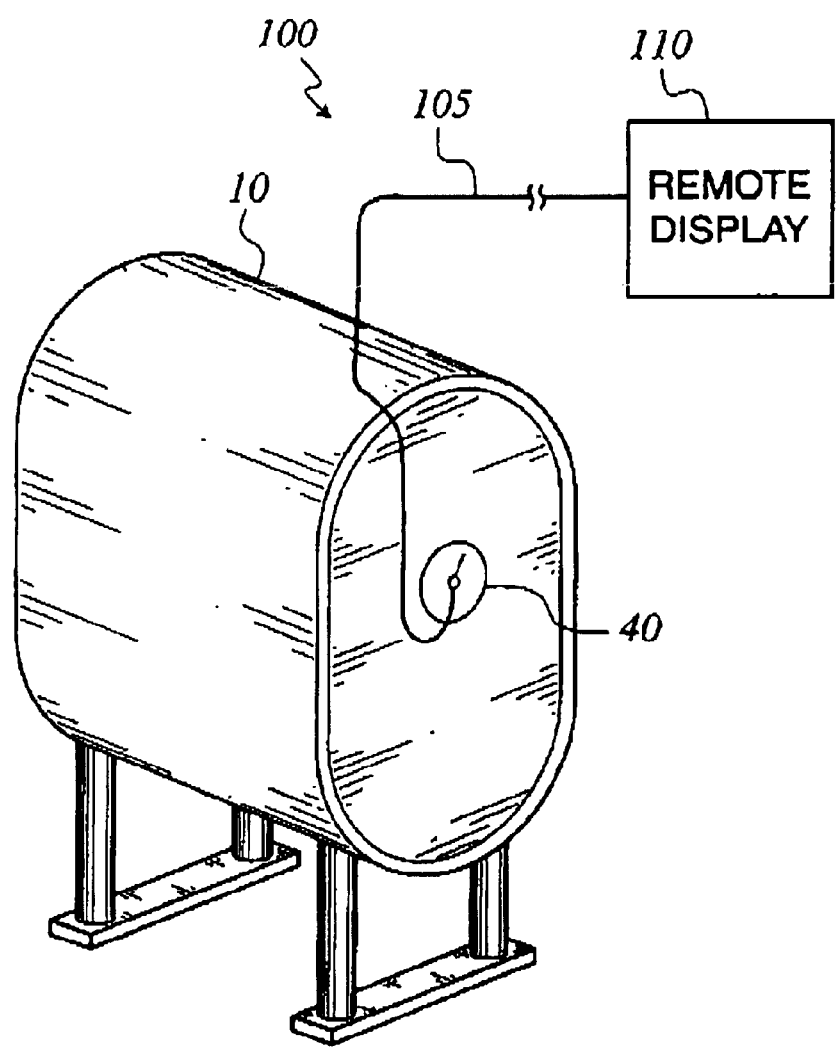
FIG. 1 is a perspective schematic representation of a fuel tank assembly including the present invention.

Referring to FIG. 1, a liquid storage tank assembly 100 including the present invention is illustrated. Assembly 100 includes a dial indicator 40 mounted to a liquid storage tank 10. Dial indicator 40 provides a local visible indication of the liquid level in tank 10 and is coupled 105 to a remote display 110 for also providing remote indication of the liquid level in tank 10. Dial indicator 40 may be coupled 105 to remote display 110 by any known link, such as a direct electrical connection (e.g., one or more wires), a telephone link including a modem and a hardwired telephone line or a cellular telephone link, or a radio frequency communications link.

Figure 3:
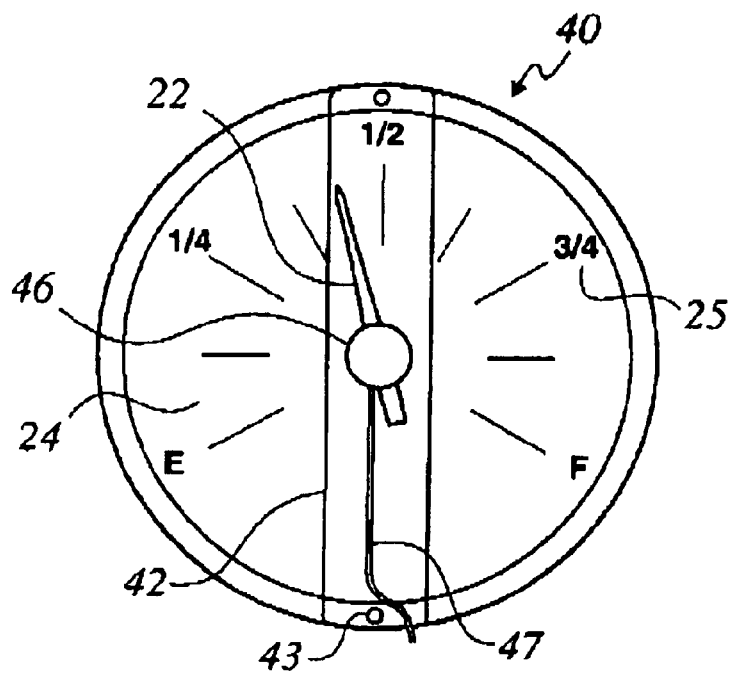
FIG. 3 is a schematic, front view representation one embodiment of a dial indicator configuring according to the present invention.
Figure 4:
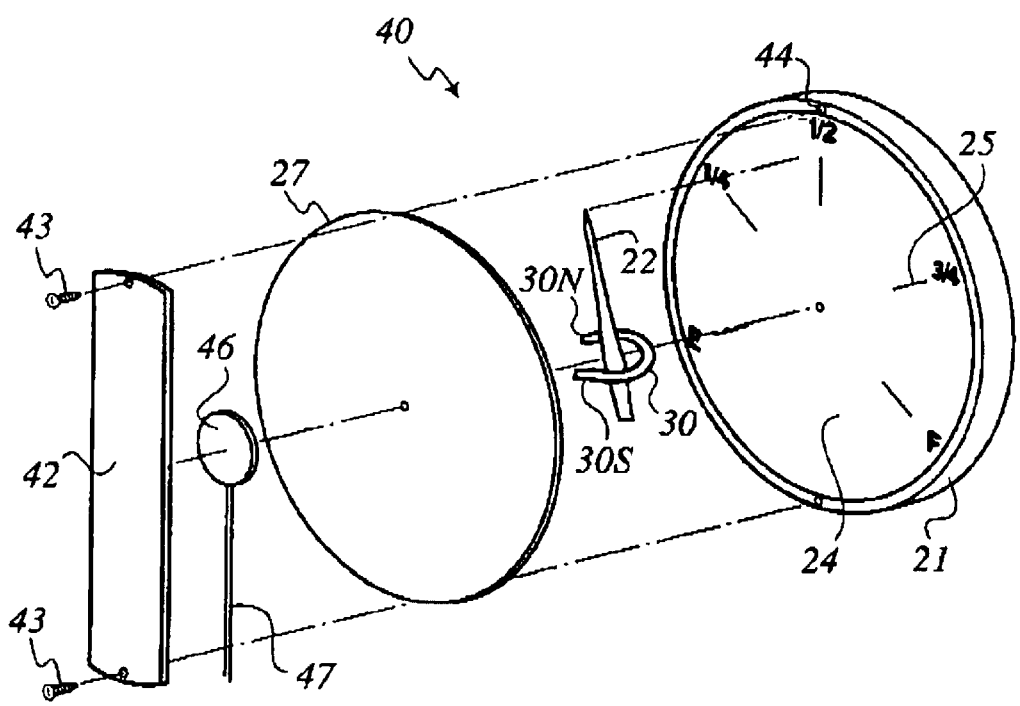
FIG. 4 is an exploded perspective schematic view of the dial indicator of FIG. 3.
Figure 5:
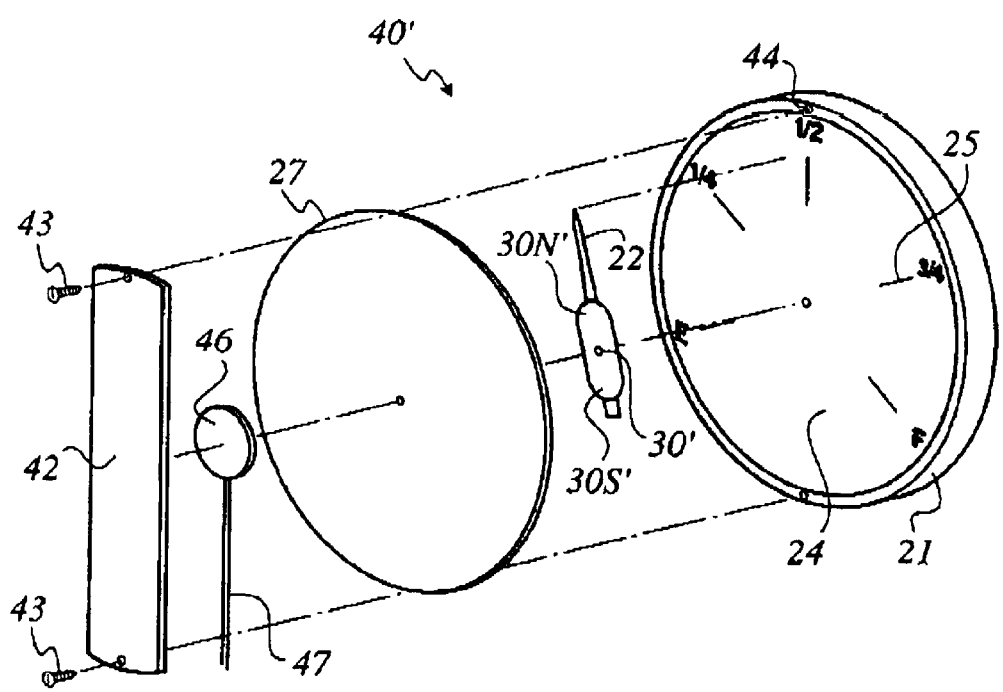
FIG. 5 is a view similar to that of FIG. 4, of another embodiment of this invention.

Referring now to FIGS. 3–5, a dial indicator 40 constructed according to the principles of the present invention is shown. Briefly described, the present invention includes a dial indicator 40 that provides for both local visible and remote indication of a physical parameter, such as temperature, pressure, liquid level and the like. Dial indicator 40 is particularly useful for monitoring the liquid level in large liquid storage tanks (e.g., liquid storage tank 10 in FIG. 1) in which liquefied natural gas, liquid propane, or liquid ammonia is stored. Dial indicator 40 includes a potentiometer 46 fastened to a front side thereof (e.g., to a transparent cover 27). Potentiometer 46 is magnetically coupled to a magnet 30, 30', which is coupled to the rotary dial pointer 22 in a manner allowing the magnet 30 to rotate with the pointer 22 in response to a change in the measured physical parameter. This invention also includes a method for retrofitting a conventional dial indicator to include the capability of providing remote indication, in which a magnet 30, 30' is coupled to the rotary dial pointer 22 and a potentiometer 46 is magnetically coupled to magnet 30, 30' and fastened to a front side of the dial indicator 40.

The present invention is advantageous in that it provides a relatively simple and inexpensive dial indicator capable of providing both local and remote indication of a physical parameter. Further, this invention provides a relatively simple and inexpensive method for upgrading a conventional dial indicator of substantially any type to include the capability of providing remote indication of a physical parameter. Additional advantages of this invention are discussed hereinbelow along with a more detailed description of the invention.

Figure 2:
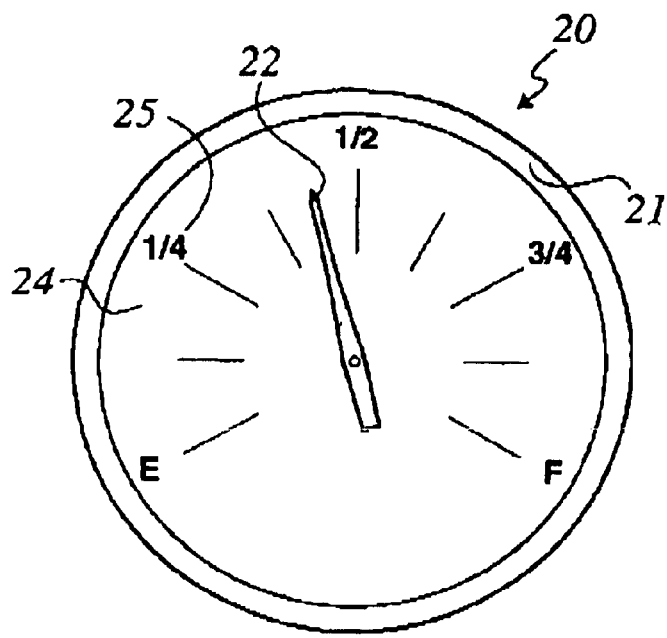
FIG. 2 is a schematic, front view representation of a prior art dial indicator of the type useful in conjunction with the present invention.

Referring now to FIG. 2, a conventional dial indicator 20 typically includes a housing 21 having a faceplate 24 with indicia 25 printed thereon. A rotary dial pointer 22 coupled to a conventional sensor mechanism (not shown) provides for a visible indication of the measured physical parameter. Dial indicator 20 also typically includes a transparent cover 27 (see FIGS. 4–5) on the front face thereof.

Referring again to FIGS. 3–5, embodiments of a dial indicator 40 including the present invention are illustrated and described in more detail. Referring initially to FIG. 3, dial indicator 40 is similar to dial indicator 20 in that it includes a housing 21 having a faceplate 24 with indicia 25 printed thereon and a rotary pointer 22 for providing a visible indication of the measured physical parameter. Rotary pointer 22 may be any type that is typically used in gauges known in the art, such as shown and described in U.S. Pat. No. 4,975,687 to Murphy, Jr. et al. Dial indicator 40 further includes a potentiometer 46 (described in greater detail hereinbelow), typically having at least two electrical connectors 47 coupled thereto for providing an electrical output indication of the measured physical parameter. Potentiometer 46 is typically fastened to the front side of dial indicator 40 by a bracket 42, which may be fastened to housing 21 using conventional fasteners 43 (e.g., screws, bolts or pins threaded or otherwise inserted into one or more recesses 44 (FIGS. 4–5) in housing 21). The term "front side", as used herein, shall refer to the side of the dial indicator from which a visual reading may be obtained. Bracket 42 is typically, but not necessarily, constructed of an optically transparent material, such as a relatively clear plastic sold under the trademark PLEXIGLAS® (Rohm & Haas Company, Philadelphia Pa.), or under the trademark LEXAN® (General Electric Company, Pittsfield Mass.). The bracket may also be fabricated from various opaque materials, such as aluminum or stainless steel. The bracket 42 is fastened to the front side of potentiometer 46 and screwed into housing 21.

Referring now to FIGS. 4 and 5, dial indicators 40 and 40' of this invention further include one or more magnets 30, 30' physically coupled to rotary pointer 22. Magnet(s) 30, 30' may be any type having north 30N, 30N' and south 30S, 30S' poles and are typically relatively small in order to be easily installed in the dial indicator 40, 40'. In embodiment 40 (FIG. 4), a horseshoe magnet 30 is looped around the backside (i.e., opposite to front side) of the rotary pointer 22 and is disposed with its poles 30N, 30S oriented towards the front side of the dial indicator 40. In another embodiment indicator 40' (FIG. 5) includes a magnet 30', in which opposite sides or ends have opposite poles 30N', 30S', and which is physically coupled to the rotary pointer e.g., by gluing it to the front side thereof.

Figure 7:
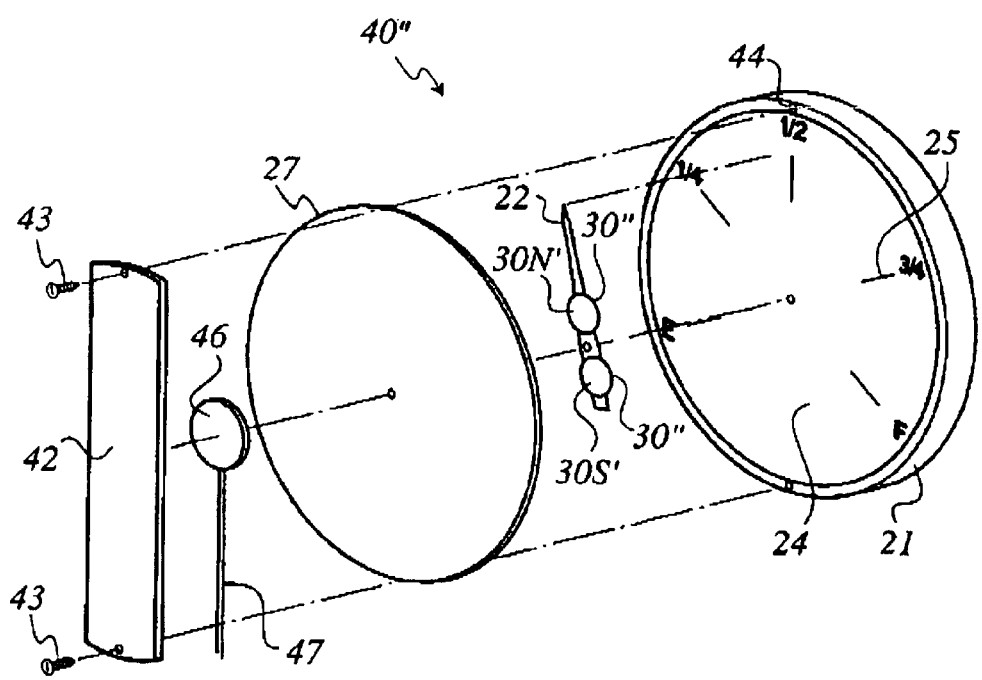
FIG. 7 is a view similar to those of FIGS. 4 and 5, of another embodiment of this invention.

Magnet 30' may be a bar magnet, or may be a thin horseshoe magnet (similar in size and shape to a coin, having both poles 30N' and 30S' on the same flat side thereof). Such a magnet may be provided with a central hole (not shown) through which a rivet or similar fastener may extend to attach the magnet to the pointer at its axis of rotation. Still further, a pair of magnets 30", each having poles 30N' and 30S' on opposite sides thereof, may be provided as shown in FIG. 7. These magnets 30" may be fastened to the pointer (e.g., using glue), with opposite poles facing the potentiometer 46. Use of multiple magnets 30" may be particularly useful in retrofit applications, as discussed in greater detail hereinbelow. As shown, multiple magnets 30" may be balanced about the axis of rotation of pointer 22 (e.g., magnets 30" may be disposed on opposite sides of the axis of rotation of the pointer) to help prevent uneven or excessive wear of the pointer mechanism. Alternatively, in the event it is desirable to dispose one or more magnets 30, 30', 30" assymetrically about the axis of rotation, one or more weights may be applied to the pointer 22 where desired to counterbalance the magnet(s). Magnet(s) 30, 30', 30" are thus coupled to rotary pointer 22 in a manner that allows them to rotate with the pointer 22 in response to a change in the measured physical parameter. As a still further alternative, a replacement pointer 22 may be provided, having magnet(s) 30' 30" integrally disposed therewith, such as for inclusion in a kit as discussed hereinbelow. For example, replacement pointer 22 may include a magnet fabricated in the form of a rotary pointer.

Potentiometer 46 may be any that may be adjusted by the rotation of a magnetic field (hereafter referred to as magnetically adjustable) and is magnetically coupled to magnet 30, 30', 30". A change in the orientation of rotary pointer 22 therefore changes the electrical output of potentiometer 46. As mentioned hereinabove potentiometer 46 typically includes at least two electrical connectors or ports (e.g., wires), which may be connected to a remote display (e.g., remote display 110). Alternatively, as described above, the electrical output may be used in combination with a radio frequency or other wireless communication device to provide for remote monitoring. Further, potentiometer 46 typically includes a diameter less than about half that of dial indicator 40 in order not to obscure visual reading of the indicator 40. In one embodiment, potentiometer 46 may be a single-turn, magnetically adjustable voltage divider. In another embodiment, potentiometer 46 may include another dial indicator having an internal magnetically actuatable voltage divider (e.g., the Twinsite® potentiometer (P/N P5928S02669) as manufactured and sold by Rochester Gauges, Inc., Dallas, Tex.).

This invention may also include a kit for upgrading a prior art dial indicator 20 to provide both local visible and remote indication of a physical parameter. The kit may include one or more magnets 30, 30', 30" sized and shaped for coupling to a rotary pointer 22 so that the magnet rotates with the rotary pointer 22 in response to a change in the measured physical parameter. (The kit may alternatively include a replacement (i.e., substitute) pointer 22 having one or more magnets integrally disposed thereon, as mentioned hereinabove.) The kit may also include a magnetically adjustable potentiometer 46 and a mounting assembly that includes a bracket 42, sized and shaped for fastening the potentiometer 46 to the dial indicator 20, and at least one fastener 43. The kit may further include a remote display 110 for providing remote indication of the measured physical parameter. The kit may still further include components necessary for linking the potentiometer 46 to the remote display, such as electrical wire, telephone wire, a modem, a radio transmitter/receiver, and the like. As mentioned hereinabove, use of multiple magnets 30" may be advantageous in retrofit applications, since the magnets 30" may be fastened to the pointer 22 without requiringremoval or disassembly of the pointer 22, to provide relatively simple and quick installation.

Figure 6:
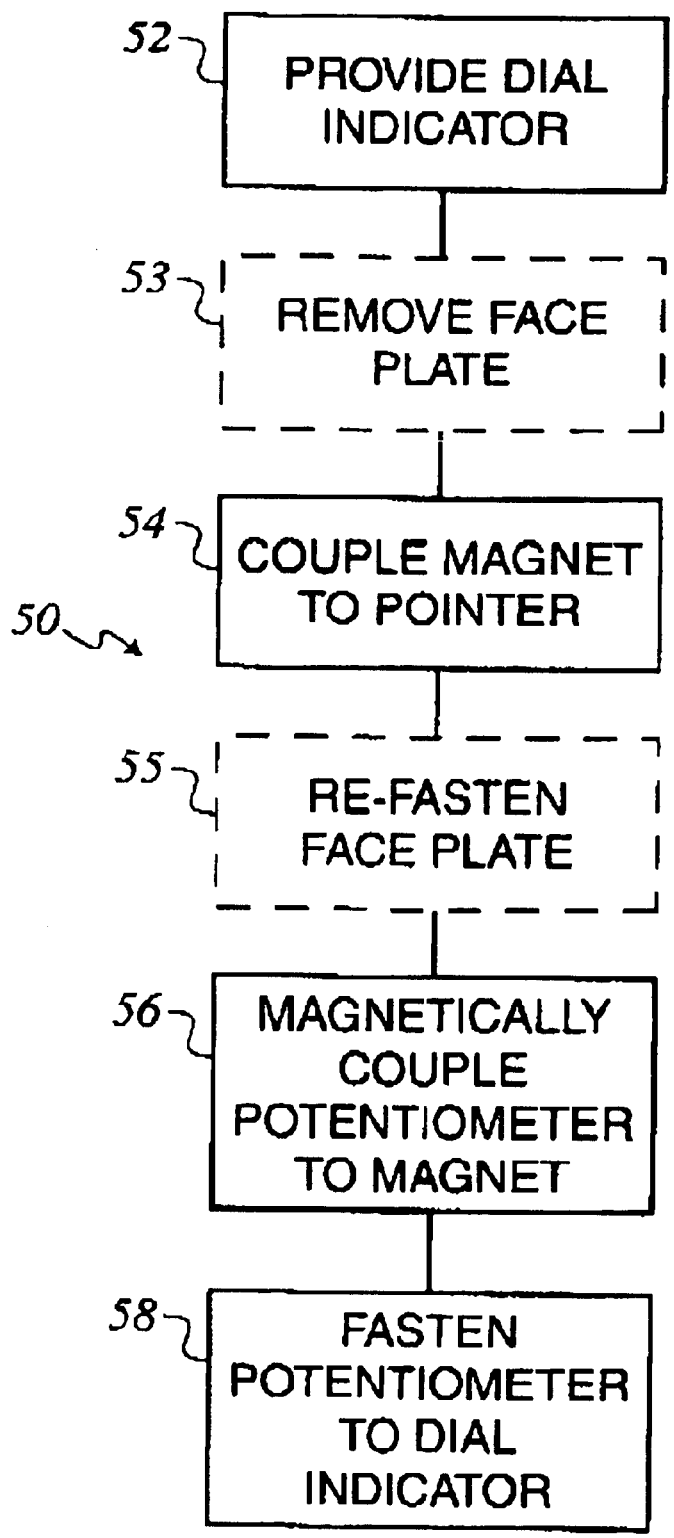
FIG. 6 is a flow chart representation of one embodiment of the method of this invention.

Referring now to FIG. 6, an embodiment of the method of this invention is described in more detail. At 52 a conventional dial indicator 20 is used or provided. Dial indicator 20 may be configured to monitor any of numerous physical parameters such as temperature, pressure, liquid level, and the like. In one useful embodiment, a dial 20 indicator mounted to a liquid storage tank (e.g., a liquefied natural gas, a liquid propane, or a liquid ammonia storage tank) is utilized. At 53, the dial indicator cover 27 may optionally be removed. It may be further necessary to remove the rotary pointer 22 and its associated bearing assembly. At block 54 one or more magnets 30, 30', 30" (FIGS. 4, 5, and 7) are physically coupled to the rotary pointer 22 in a manner that allows them to rotate with the pointer 22, as discussed hereinabove. At 55 the cover 27 may be refastened to the dial indicator 20. For some applications it may be necessary to modify (e.g., bend or cut) the cover 27 in order to prevent it from interfering with the installed magnet(s) 30, 30'. At 56, a potentiometer 46 is disposed on the front side of dial indicator 20 (e.g., on the front side of the cover 27) in a manner enabling it to be magnetically coupled to the magnet (s) 30, 30'. The potentiometer 46 is then fastened 58 to the dial indicator 20 using any known fastening means. For example, in one embodiment, a transparent bracket is disposed on the front side of the potentiometer 46 and screwed into the dial indicator housing 21 in order to hold the potentiometer 46 securely in place.

The modifications to the various aspects of the present invention described hereinabove are merely exemplary. It is understood that other modifications to the illustrative embodiments will readily occur to persons with ordinary skill in the art. All such modifications and variations are deemed to be within the scope and spirit of the present invention as defined by the accompanying claims.

What is claimed is:

1. A method for upgrading a dial indicator to provide both local visible and remote indication of a physical parameter, said method comprising:
   providing the dial indicator with a magnetic rotary pointer, said magnetic rotary pointer being rotatable in response to a change in the physical parameter;
   magnetically coupling a potentiometer to said magnetic rotary pointer, said potentiometer being magnetically adjustable, wherein a rotation of said magnetic rotary pointer causes a change in the electrical output of said potentiometer; and
   fastening said potentiometer to a front side of the dial indicator.

2. The method of claim 1, wherein said providing is accomplished by securing a magnet to a rotary pointer of the dial indicator.

3. The method of claim 1, wherein said providing is accomplished by replacing a rotary pointer of the dial indicator with a replacement rotary pointer, said replacement pointer having a magnet disposed integrally therewith.

4. The method of claim 1 wherein the dial indicator comprises a liquid level indicator for a storage tank.

5. The method of claim 1 wherein the dial indicator is mounted to a liquid storage tank.

6. The method of claim 5 wherein said storage tank comprises a natural gas storage tank.

7. The method of claim 5 wherein said storage tank comprises a liquid propane storage tank.

8. The method of claim 5 wherein said storage tank comprises a liquid ammonia storage tank.

9. The method of claim 1 wherein said magnet comprises a plurality of magnets disposed in spaced relation along said rotary pointer.

10. The method of claim 9, wherein said plurality of magnets comprises a pair of magnets disposed on said rotary pointer, on opposite sides of an axis of rotation of said pointer, said pair of magnets being disposed in opposite orientation relative to one another so that opposite poles face away from the dial indicator.

11. The method of claim 1 wherein said magnet comprises a bar magnet.

12. The method of claim 11 wherein said magnet is coupled to a front side of said rotary pointer.

13. The method of claim 1 wherein said magnet comprises a horseshoe magnet.

14. The method of claim 11 wherein said coupling comprises looping said magnet around a backside of said rotary pointer.

15. The method of claim 1 wherein said potentiometer comprises a magnetically adjustable voltage divider.

16. The method of claim 1 wherein said potentiometer comprises a single-turn potentiometer.

17. The method of claim 1 wherein said potentiometer comprises an other dial indicator, said other dial indicator including a voltage divider, said other dial indicator having a diameter less than about half that of the dial indicator.

18. The method of claim 1 wherein said potentiometer comprises at least two electrical connectors.

19. The method of claim 1 further comprising coupling said potentiometer to a wireless communication device.

20. The method of claim 1 wherein said potentiometer is fastened to a transparent cover.

21. The method of claim 1 wherein said fastening said potentiometer comprises interposing said potentiometer between a bracket and a transparent face plate, and fastening said bracket to the dial indicator.

22. The method of claim 21 wherein said bracket comprises an optically transparent material.

23. The method of claim 22 wherein said optically transparent material comprises plastic.

24. The method of claim 1, wherein said providing the dial indicator with a magnetic rotary pointer further comprises:

removing a cover from the front face of the dial indicator; and refastening said cover to the front face of the dial indicator.

25. A kit for upgrading a dial indicator to provide both local visible and remote indication of a physical parameter, said kit comprising:

a magnet, sized and shaped for coupling to the dial indicator in a manner wherein said magnet rotates in response to a change in the measured physical parameter;

a magnetically adjustable potentiometer; and a mounting assembly including a bracket sized and shaped for fastening said potentiometer to the dial indicator.

26. The kit of claim 25, wherein said magnet is sized and shaped for being secured to a rotary pointer of the dial indicator.

27. The kit of claim 25, wherein said magnet comprises a replacement rotary pointer.

28. The kit of claim 25 wherein said magnet comprises a horseshoe magnet.

29. The kit of claim 25 wherein said magnet comprises a bar magnet.

30. The kit of claim 25 wherein said potentiometer comprises a single-turn voltage divider.

31. The kit of claim 25 wherein said potentiometer comprises an other dial indicator, said other dial indicator including a magnetically actuatable voltage divider, said other dial indicator having a diameter less than about half that of said dial indicator.

32. The kit of claim 25 wherein said bracket comprises an optically transparent material.

33. The kit of claim 32 further comprising a remote display.

34. A dial indicator for providing both local visible and remote display of liquid level in a liquid storage tank, said dial indicator comprising:

a magnetic rotary pointer, said magnetic rotary pointer being rotatable in response to a change in the liquid level in the tank;

a magnetically adjustable potentiometer including a voltage divider and at least two electrical connectors, said potentiometer being magnetically coupled to said magnetic rotary pointer wherein a rotation of said magnetic rotary pointer causes a change in the electrical output of said potentiometer;

said potentiometer being mounted to a front side of said dial indicator by a transparent bracket.

35. The dial indicator of claim 34, wherein said magnetic rotary pointer comprises a rotary pointer of the dial indicator having a magnet secured thereto.

36. The dial indicator of claim 34, wherein said magnetic rotary pointer comprises a replacement rotary pointer, said replacement pointer having a magnet disposed integrally therewith.

37. The dial indicator of claim 34 wherein said potentiometer comprises an other dial indicator, said other dial indicator including a voltage divider.

38. The dial indicator of claim 34, wherein said potentiometer comprises an other dial indicator, and said other dial indicator has a diameter less than about half that of said dial indicator.

39. A method for upgrading a dial indicator to provide both local visible and remote indication of a physical parameter, said method comprising:

providing a dial indicator having a substantially transparent faceplate and a rotary pointer, the rotary pointer being rotatable in response to a change in the physical parameter thereby providing the local visible indication of the physical parameter;

removing the faceplate from the dial indicator;

physically coupling at least one magnet to the rotary pointer;

re-fastening the faceplate to the dial indicator;

magnetically coupling a potentiometer to the at least one magnet, the potentiometer being magnetically adjustable, wherein a rotation of rotary pointer causes a change in the electrical output of the potentiometer, thereby providing the remote indication of the physical parameter; and fastening the potentiometer to a front side of the dial indicator.

* * * * *